(12) United States Patent
Vespa

(10) Patent No.: US 10,350,967 B2
(45) Date of Patent: Jul. 16, 2019

(54) HEAT PUMP SYSTEM FOR A VEHICLE

(71) Applicants: HYUNDAI MOTOR COMPANY, Seoul (KR); KIA MOTORS CORPORATION, Seoul (KR)

(72) Inventor: Antonio Vespa, Tehachapi, CA (US)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 247 days.

(21) Appl. No.: 15/465,221

(22) Filed: Mar. 21, 2017

(65) Prior Publication Data
US 2018/0272830 A1 Sep. 27, 2018

(51) Int. Cl.
F25B 7/00 (2006.01)
F25B 41/04 (2006.01)
B60H 1/00 (2006.01)
B60H 1/32 (2006.01)
F25B 49/02 (2006.01)
(Continued)

(52) U.S. Cl.
CPC ....... *B60H 1/3213* (2013.01); *B60H 1/00392* (2013.01); *B60H 1/00921* (2013.01); *B60H 1/32281* (2019.05); *F25B 7/00* (2013.01); *F25B 25/005* (2013.01); *F25B 41/04* (2013.01); *F25B 41/046* (2013.01); *F25B 49/02* (2013.01); *B60H 1/00385* (2013.01); *B60H 2001/00178* (2013.01); *B60H 2001/00928* (2013.01); *F25B 5/04* (2013.01); *F25B 6/04* (2013.01); *F25B 2339/047* (2013.01); *F25B 2341/0662* (2013.01); *F25B 2400/0409* (2013.01); *F25B 2400/0411* (2013.01); *F25B 2600/2501* (2013.01); *F25B 2600/2507* (2013.01)

(58) Field of Classification Search
CPC .. F25B 7/00; F25B 41/046; F25B 2400/0409; F25B 2600/2507; F25B 2600/2515; B60H 1/00007; B60H 1/00385
See application file for complete search history.

(56) References Cited

U.S. PATENT DOCUMENTS 6,705,101 B2 *  3/2004  Brotz ................ B60H 1/00
                                                    62/198
8,517,087 B2     8/2013  Zeigler et al.
(Continued)

FOREIGN PATENT DOCUMENTS

KR          101195077 B1     10/2012
KR          20130013008 A    2/2013

*Primary Examiner* — Edward F Landrum
*Assistant Examiner* — Daniel C Comings
(74) *Attorney, Agent, or Firm* — Brinks Gilson & Lione

(57) ABSTRACT

The present disclosure provides a heat pump system for a vehicle having a first heat source. The heat pump system includes: a first heat exchanger; a second heat exchanger; a primary loop through which coolant circulates, the primary loop passing through the first and second heat exchangers; and a secondary loop through which a refrigerant circulates. In particular, the primary loop includes a flow control device to control the direction and the flow rate of a coolant passing through the primary loop, and a bypassing line through which the coolant selectively bypasses the first heat source in the primary loop. The secondary loop is thermally coupled to the primary loop via the second heat exchanger, and the secondary loop further includes a compressor, an evaporator, and a condenser.

19 Claims, 11 Drawing Sheets

(51) Int. Cl.
*F25B 25/00* (2006.01)
*F25B 5/04* (2006.01)
*F25B 6/04* (2006.01)

(56) References Cited

U.S. PATENT DOCUMENTS

2012/0216983 A1 8/2012 Bennion et al.
2012/0318012 A1 12/2012 Choi et al.
2014/0208789 A1 7/2014 Lombardo et al.

* cited by examiner

HEAT PUMP SYSTEM FOR A VEHICLE

FIELD

The present disclosure relates to a heat pump system for a vehicle or for an electric vehicle.

BACKGROUND

The statements in this section merely provide background information related to the present disclosure and may not constitute prior art.

In general, an air conditioning system for a vehicle includes an air conditioning module warming or cooling a passenger compartment of the vehicle. The air conditioning module uses a compressor to circulate a heat exchange medium through a condenser, an expansion valve, an evaporator, etc. With this arrangement, the air conditioning system warms up or cools the cabin of the vehicle.

In the vehicle having a conventional internal combustion engine, the engine produces the power and heat used for the operation of the air conditioning system. Meanwhile, electricity is the sole or main power source for running environmentally friendly vehicles such as an electric vehicle, a plug-in hybrid electric vehicle, a fuel cell vehicle, and a hybrid vehicle, so that the consumption of electricity directly affects the travel capacity of the vehicles. The auto-industry has strived for developing various technologies and systems to improve energy efficiency of the air conditioning system and at the same time for simplifying the system to reduce weight and manufacturing cost.

In one form, a heat pump system for environmentally friendly vehicles has been developed to increase the heating and cooling efficiency and thus to increase the travel capacity of the vehicles. The heat pump system may function to provide both cooling and heating the passenger compartment a vehicle based on selected modes. The heat pump system may include a high pressure loop and a low pressure loop. The high pressure loop is used to circulate a high pressure heat exchange medium such as a refrigerant: namely a refrigerant circuit, whereas the low pressure loop is used to circulate a low pressure heat exchange medium such as a coolant: namely, a coolant circuit. The environmentally friendly vehicle controls the temperature of the passenger compartment by the electrically powered heat pump system.

Since the heat pump system draws electric energy from the total energy saved for the vehicle (e.g., electric vehicle), reducing energy used by the heat pump system contributes to improving the travel capacity and energy efficiency of the vehicle.

SUMMARY

The present disclosure provides a compact heat pump system for a vehicle to improve energy efficiency.

In one form, the present disclosure provides a heat pump system for a vehicle having a first heat source, the heat pump system comprising: a first heat exchanger; a second heat exchanger; a primary loop through which coolant circulates; and a secondary loop through which a refrigerant circulates. In particular, the primary loop passes through the first and second heat exchangers, and includes a flow control device configured to control the direction and flow rate of a coolant passing through the primary loop. The primary loop further includes a bypassing line through which the coolant selectively bypasses the first heat source in the primary loop.

The secondary loop is thermally coupled to the primary loop via the second heat exchanger, and includes a compressor, an evaporator, and a condenser.

In another form, the first heat exchanger may be a coolant-to-air heat exchanger, and the second heat exchanger may be a refrigerant-coolant heat exchanger.

The first heat source of the primary loop may be at least one of the following: a motor, an electric device, or an onboard charger of an electric vehicle.

The primary loop further includes a second heat source disposed between the flow control device and the first heat source.

In another form, the primary loop may include a control valve displaced between the first heat source and the flow control device and configured to control an amount of the coolant bypassing the first heat source in the primary loop through the bypassing line based on a selected mode.

In still another form, the primary loop may include a second control valve displaced between the first heat exchanger and the second heat exchanger, and the second control valve is configured to control the coolant flowing into the first and second heat exchangers based on a selected mode.

The flow control device may include a first three-way valve, a second three-way valve, and a one-way coolant pump, and when a heating mode is selected, the coolant flows from the first three-way valve to the one-way coolant pump and then to the second three-way valve. When a cooling mode is selected, the coolant flows from the second three-way valve to the one-way coolant pump and then to the first three-way valve, so that directions of the coolant in the primary loop are opposite each other based on the selected heating and cooling modes.

In another form, the flow control device may include a first one-way coolant pump and a second one-way coolant pump, and when either a heating mode or a cooling mode is selected, one of the first and second one-way coolant pumps is turned on and the other one of the first and second one-way coolant pumps is turned off so that a direction of the coolant under the cooling mode is opposite to a direction of the coolant under the heating mode.

In other form, the flow control device may have a reversible coolant pump configured to discharge the coolant in one direction in a heating mode, and the reversible coolant pump, under a cooling mode, is configured to discharge the coolant in an opposite direction to the direction of the coolant in the heating mode.

The second loop does not contain a bypass around the second heat exchanger such that the refrigerant always passes through the second heat exchanger.

In one form, the heat pump system does not contain an outside refrigerant-to-air heat exchanger.

The secondary loop may pass through the first heat source.

In another form of the present disclosure, a heat pump system for an electric vehicle may include: a coolant-to-air heat exchanger; a refrigerant-coolant heat exchanger; a coolant circuit passing through the coolant-to-air heat exchanger and the refrigerant-coolant heat exchanger; and a refrigerant circuit through which a refrigerant circulates. In particular, the coolant circuit further includes: a flow control device configured to control the direction of a coolant passing through the coolant circuit based on a selected mode, and a bypassing line through which the coolant is selectively bypassing a first heat source. The refrigerant-coolant heat exchanger thermally couples the refrigerant circuit with the coolant circuit.

The first heat source of the coolant circuit is at least one of the following: a motor, an electric device, or an onboard charger of the electric vehicle.

The coolant circuit further comprises a coolant reservoir, a first three-way valve configured to control an amount of the coolant bypassing the first heat source, and a second three-way valve. In particular, the second three-way valve is connected to the coolant reservoir, the coolant-to-air heat exchanger, and the refrigerant-coolant heat exchanger, and is configured to control the coolant flowing in the coolant reservoir, the coolant-to-air heat exchanger, and the refrigerant-coolant heat exchanger based on a selected mode.

When the selected mode is a first cooling mode and heat from the first heat source is lower than a predetermined temperature, the coolant flows from the first heat source to the coolant-to-air exchanger by the flow control device and a substantial majority of the coolant bypasses the first heat source through the bypassing line by the first three-way valve.

Meanwhile, when the selected mode is a second cooling mode and heat from the first heat source is equal to or more than a predetermined temperature, the coolant flows from the first heat source to the coolant-to-air exchanger by the flow control device and the bypassing line is closed by the first three-way valve so that the coolant flows only through the first heat source.

If the selected mode is a first heating mode, the flow control device controls the direction of the coolant to sequentially flow to the first heat source, the refrigerant-coolant heat exchanger, and the second three-way valve, and the second three-way valve inhibits the coolant from flowing into the coolant-to-air heat exchanger and sends the coolant to the coolant reservoir.

When the selected mode is a second heating mode and an ambient air temperature is higher than a predetermined temperature, the flow control device controls the direction of the coolant to sequentially flow to the first heat source, the refrigerant-coolant heat exchanger, and the second three-way valve, and the second three-way valve inhibits the coolant from flowing into the coolant reservoir and sends the coolant to the coolant-to-air heat exchanger.

In one form, the heat pump system further includes an electric heater disposed in the coolant circuit and transfers heat to the first heat source while the electric vehicle is connected to an outside power grid for electric charging.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
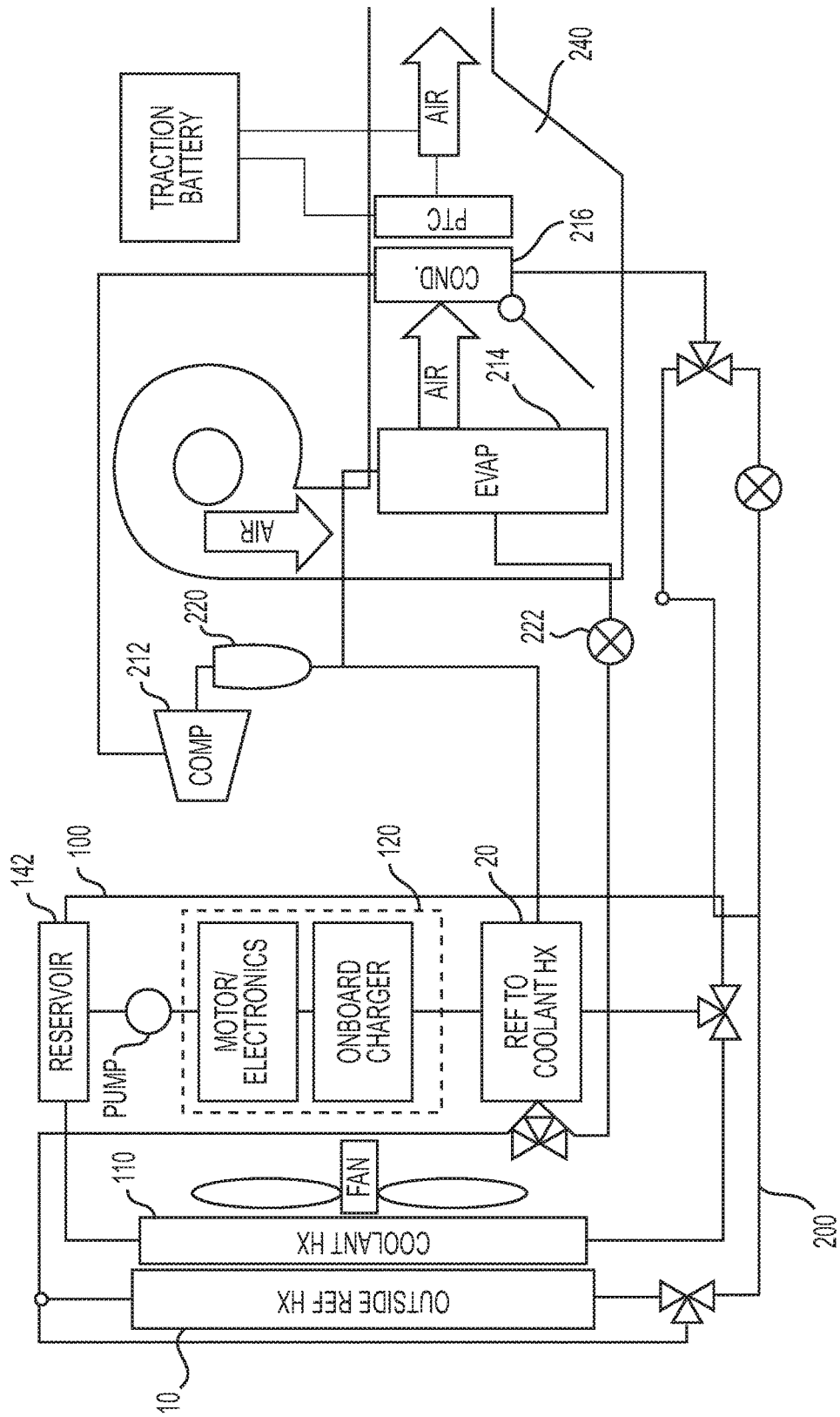
FIG. 1 is a schematic diagram of a conventional type heat pump system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the present disclosure, the primary loop means a loop or a circuit to circulate a low pressure heat exchange medium such as a coolant, and the secondary loop means a loop or a circuit to circulate a high pressure heat exchange medium, for example, a refrigerant. However, the heat exchange medium is not limited to these exemplary forms.

Various aspects of the present disclosure are directed to providing a heat pump system for a vehicle having the advantages of using a waste heat source to heat a low pressure heat exchange medium (e.g., coolant) and exchange the heat between the coolant and a high pressure heat exchange medium (e.g., refrigerant) to improve heating efficiency.

Figure 2:
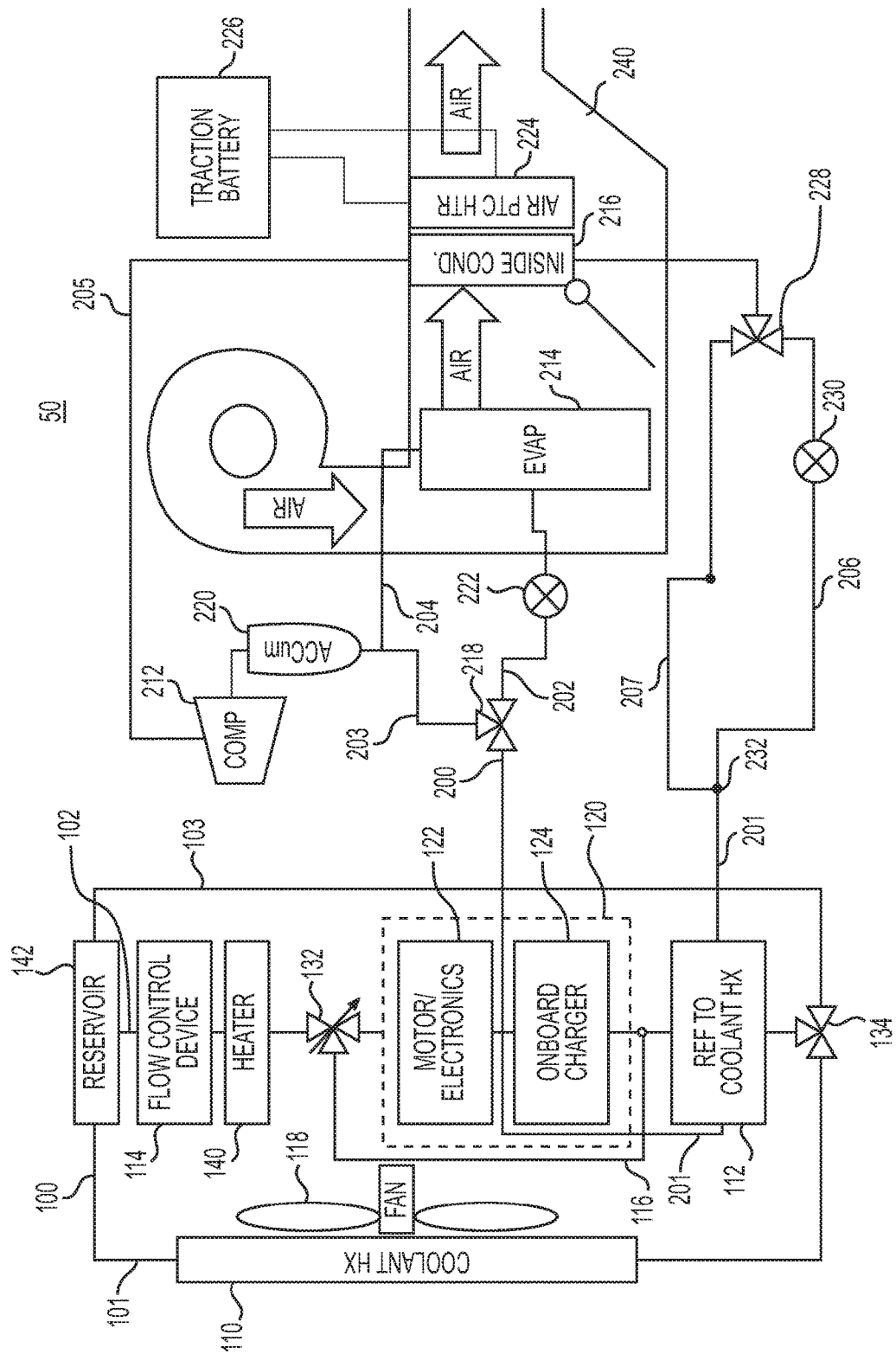
FIG. 2 is a schematic diagram of a heat pump system.

In one form of the present disclosure, as illustrated in FIG. 2, the heat pump system 50 for a vehicle having a first heat source includes: a first heat exchanger 110; a second heat exchanger 112; a primary loop 100 through which coolant circulates; and a secondary loop 200 through which a refrigerant circulates. In particular, the primary loop 100 passes through the first and second heat exchangers 110, 112, and includes: a flow control device 114 to control a direction and a flow rate of the coolant passing through the primary loop 100; and a bypassing line 116 through which the coolant selectively bypasses the first heat source 120. The secondary loop 200 is thermally coupled to the primary loop 100 via the second heat exchanger 112 and includes a compressor 212, an evaporator 214, and a condenser 216. In one form, the secondary loop 200 passes through the first heat source 120 so as to absorb waste heat generated from the first heat source 120.

In one form, the first heat exchanger 110 may be a coolant-to-air heat exchanger such as a radiator disposed on the front side of the vehicle. When the coolant flows through the coolant-to-air heat exchanger, the coolant is cooled by outside air, or the cooling fan 118. The second heat exchanger 112 may be a refrigerant-coolant heat exchanger by which the primary loop 100 and the secondary loop 200 exchange heat with each other so that the two loops are thermally coupled with each other. In particular, the secondary loop 200 (e.g., the refrigerant circuit) does not include an outside refrigerant-to-air heat exchanger and a corresponding refrigerant tubing, which are used in a conventional type of a refrigerant circuit of a vehicle, so that the heat pump system of the present disclosure reduces the amount of refrigerant desired for operating a heating, ventilation, and air conditioning system 240 (i.e., HVAC system) and also reduces the weight of the whole heat pump system.

Referring to FIGS. 1-2, in absence of the conventional refrigerant-to-air heat exchanger 10 in the secondary loop 200 (e.g., the refrigerant circuit), the refrigerant-coolant heat exchanger 112 of the present disclosure replaces the functionality of the refrigerant-to-air heat exchanger 10 and thus has a larger capacity than a refrigerant-coolant heat exchanger 20 used for an electric vehicle in the art. In one form, the capacity of the refrigerant-coolant heat exchanger 112 of the present disclosure may be approximately five times the capacity of the refrigerant-coolant heat exchanger 20 used in the art for environmentally friendly vehicles.

As illustrated in FIG. 2, the secondary loop 200 further includes: a first refrigerant three-way valve 218, an accumulator 220, a refrigerant expansion valve 222, and an electric heater 224 powered by a battery 226. The refrigerant flows in the secondary loop 200 and changes its flow direction based on selected modes such as a heating mode, a cooling mode, etc., for heating or cooling the air supplied to the passenger compartment via the HVAC system 240.

The first heat source 120 of the primary loop may be at least one of the following: a motor, an electric device 122, or an onboard charger 124 of an electric vehicle. The heat generated from the first heat source 120 (e.g., such as motor or electric device 122, and/or charger 124) is transferred to the coolant while the coolant passes near or through the motor, electric device 122, or the onboard charger 124. As illustrated in FIGS. 3-6, the heat of the coolant is transferred to the refrigerant via the refrigerant-coolant heat exchanger 112 while the refrigerant circulates in the refrigerant circuit 200 in the heating mode. In the cooling mode, the heat of the coolant is released outside of the vehicle while the coolant passes through the coolant-to-air heat exchanger 110 and the cooled coolant decreases the temperature of the refrigerant while the refrigerant and the coolant separately pass through the refrigerant-coolant heat exchanger 112.

Referring to FIG. 2, the primary loop 100 may further include a second heat source 140 disposed between the flow control device 114 and the first heat source 120. In one form, the second heat source 140 is an electric heater to provide an additional heat to the coolant in the heating mode and a preconditioned heat mode. The primary loop 100 (hereinafter the coolant circuit) further has a coolant reservoir 142, a first three-way valve 132 (e.g., variable coolant three-way valve) to control an amount of the coolant bypassing the first heat source through the bypassing line 116, and a second three-way valve 134 (e.g., coolant three-way valve) which is placed between the coolant-to-air heat exchanger 110 and the refrigerant-coolant heat exchanger 112 and the reservoir. The coolant three-way valve 134 is directly connected to the coolant reservoir 142, the coolant-to-air heat exchanger 112, and the refrigerant-coolant heat exchanger 110. The second three-way valve 134 controls the coolant flowing into the coolant-to-air heat exchanger, and the refrigerant-coolant heat exchanger from the coolant reservoir based on a selected mode.

The primary loop 100 consists of a first line 101, a second line 102, a third line 103, and the bypassing line 116. The first line 101 extends from the coolant reservoir 142 through the first heat exchanger 110 to the second three-way valve 134. The second line 102 extends from the coolant reservoir 142, to the flow control device 114, to the second heat source 140, to the first three-way valve 132, to the first heat source 120, to the refrigerant-coolant heat exchanger 112, and to the second three-way valve 134. The third line 103 extends from the coolant reservoir 142 to the second three-way valve 134.

As shown in FIG. 2, the secondary loop consists of a first refrigerant line 201, a second refrigerant line 202, a third refrigerant line 203, a fourth refrigerant line 204, a fifth refrigerant line 205, a sixth refrigerant line 206, a seventh refrigerant line 207. The first refrigerant line 201 extends from the first refrigerant three-way valve 218 to a junction point 232 joined to the sixth and seventh refrigerant lines 206, 207, and the second refrigerant line 202 extends from the first refrigerant three-way valve 218 through the refrigerant expansion valve 222 to an evaporator 214. The third, fourth, fifth, sixth, seventh refrigerant lines 203, 204, 205, 206, 207 respectively extend from the first refrigerant three-way valve 218 to the accumulator 220, from the accumulator 220 to the evaporator 214, from the accumulator 220 through a compressor 212 and a condenser 216 to a second refrigerant three-way valve 228, from the second refrigerant three-way valve 228 to the junction point 232, from second refrigerant three-way valve 228 through a refrigerant orifice valve 230 to the junction point 232. In another form, the refrigerant orifice valve 230 may be replaced with a thermal expansion valve or an electric controlled expansion valve. In still another form, the second refrigerant three-way valve 228, refrigerant orifice valve 230 and seventh refrigerant line 207 can be replaced with an electric controlled expansion valve capable of a full open mode.

In FIGS. 3-11, solid lines indicate circuits through which coolant or refrigerant flows, and dotted lines indicate circuits in which the flow of either coolant or refrigerant is inhibited.

Figure 3:
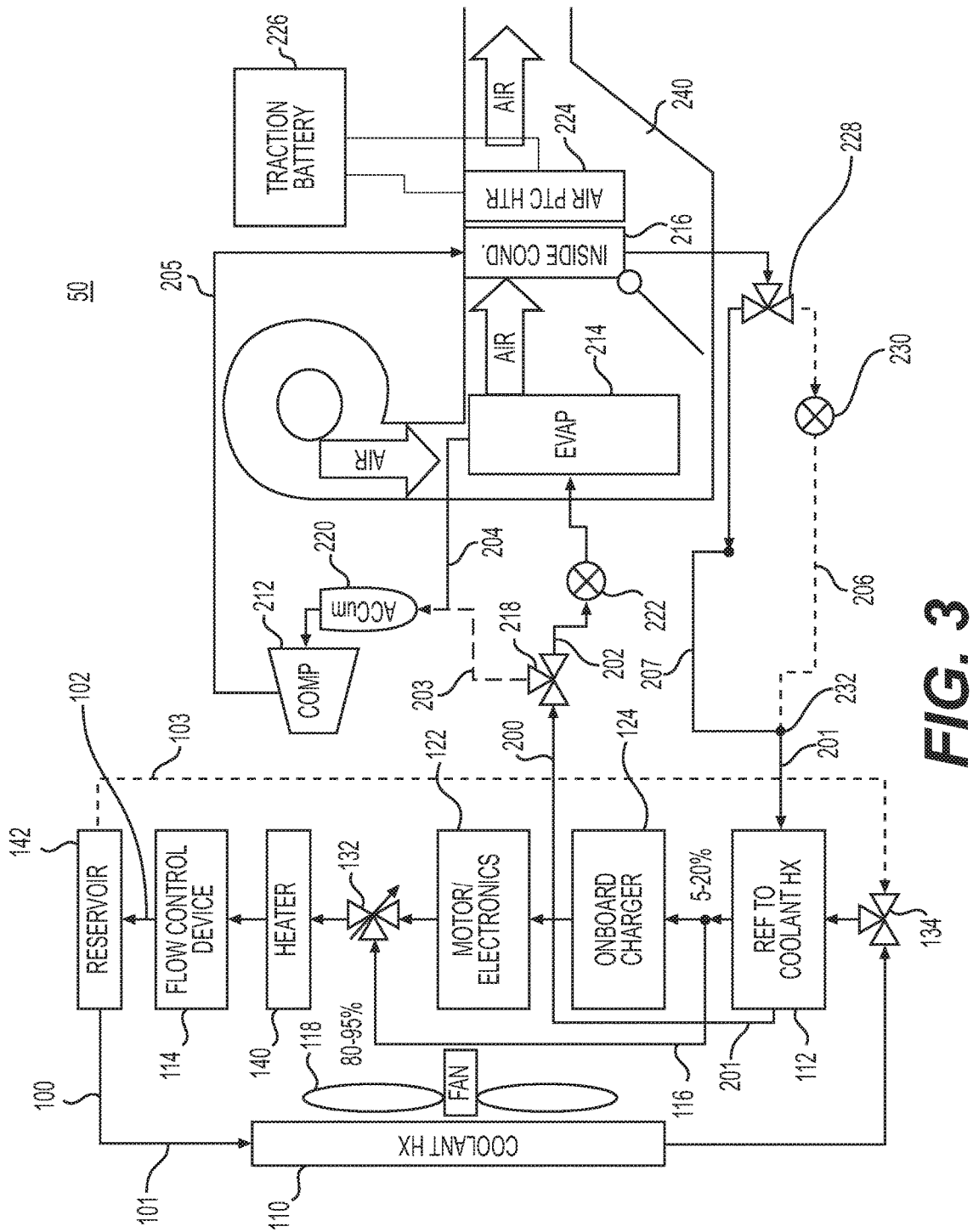
FIG. 3 is a schematic view illustrating a heat pump system in a first cooling mode.
Figure 4:
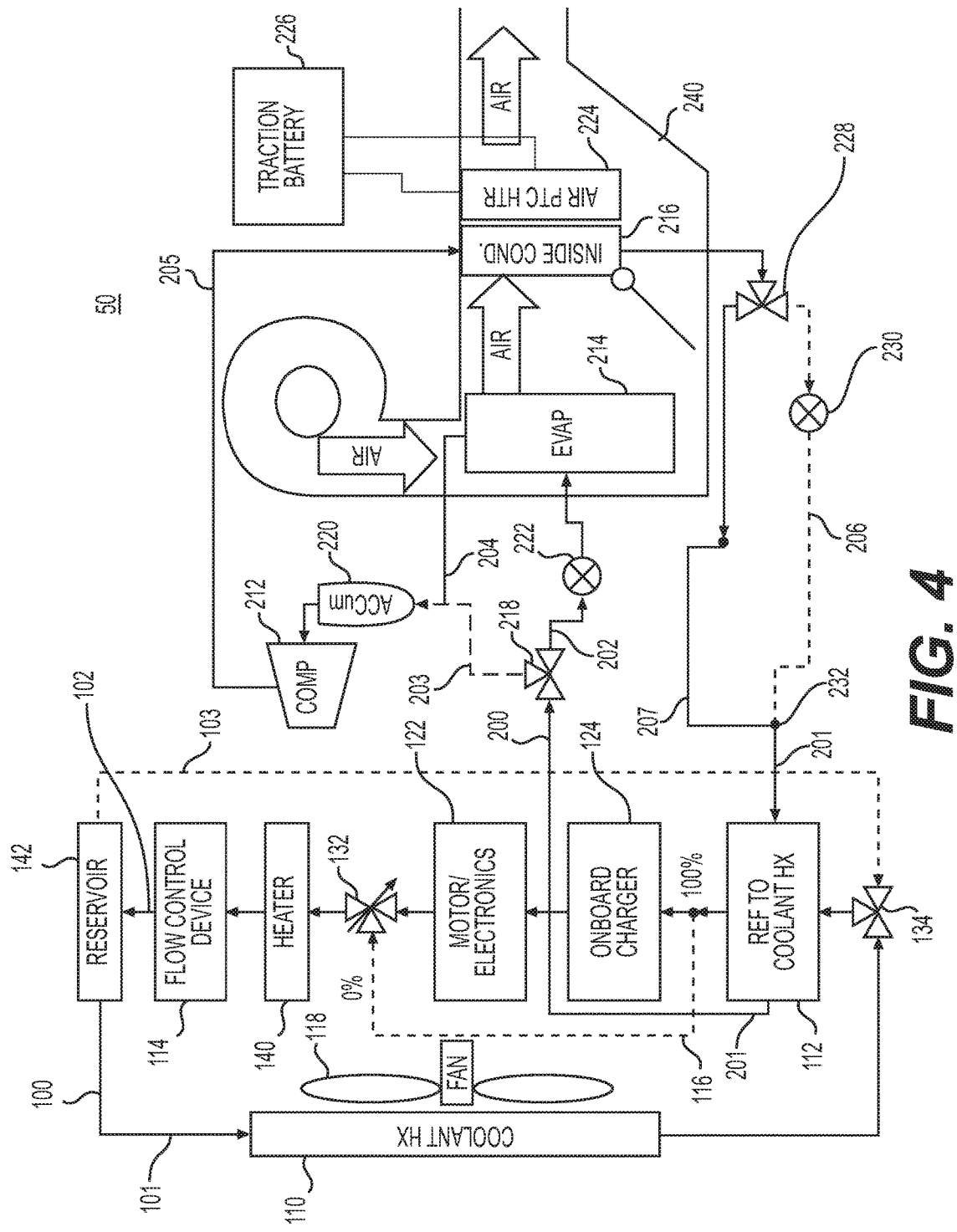
FIG. 4 is a schematic view illustrating a heat pump system in a second cooling mode.

FIGS. 3 and 4 illustrate a first cooling mode and a second cooling mode, respectively. More specifically, FIG. 3 illustrates the first cooling mode provided by one form of the present disclosure. The first cooling mode is desired when the first heat source 120 (e.g., such as the electric motor or electric device 122, and/or onboard charger 124) generates low heat insufficient to warm up the coolant and Air Conditioning (AC) requirements are high such as an idling status or initial start of the vehicle, or when the heat from the first heat source 120 is lower than a predetermined temperature. In this mode, as illustrated with solid line arrows, the flow control device 114 directs the coolant to flow in a direction from the coolant three-way valve 134 to the coolant-to-air heat exchanger 110 (i.e., flowing through the first, second and bypassing lines 101, 102, 116, and the third line 103 is blocked) so that the coolant is cooled by the coolant-to-air heat exchanger 110 and subsequently entered into the refrigerant-coolant heat exchanger 112 so as to decrease the temperature of the refrigerant passing through the refrigerant-coolant heat exchanger 112. On the secondary loop side 200, the refrigerant flows through the first, second, fourth, fifth, and seventh refrigerant lines 201, 202, 204, 205, 207, and the third and sixth refrigerant lines are blocked.

In particular, the variable coolant three-way valve 132 controls the amount of the coolant bypassing the first heat source 120 through the bypassing line 116. For example, the variable coolant three-way valve 132 may allow approximately 80 to 95% of the coolant to circulate through the bypassing line 116, and the rest of the coolant (i.e., approximately 5 to 20%) to flow through the first heat source 120 so that the coolant flow rate is increased compared to the flow rate in the second cooling mode.

As illustrated in FIG. 4, the variable coolant three-way valve 132 may close the bypassing line 116 and thus the entire coolant flows through the first heat source 120 in the second cooling mode desired when the vehicle is driving and thus the first heat source 120 (e.g., the electric motor/electric device 122, onboard charger 124) generates substantial heat when the heat from the first heat source 120 is equal to or higher than the predetermined temperature. The coolant absorbs the heat transferred from the first heat source 120 and releases the heat while it passes through the coolant-to-air heat exchanger 110. Subsequently, the coolant flows into the refrigerant-coolant heat exchanger 112 so as to cool down the refrigerant passing through the refrigerant-coolant heat exchanger 112.

Figure 5:
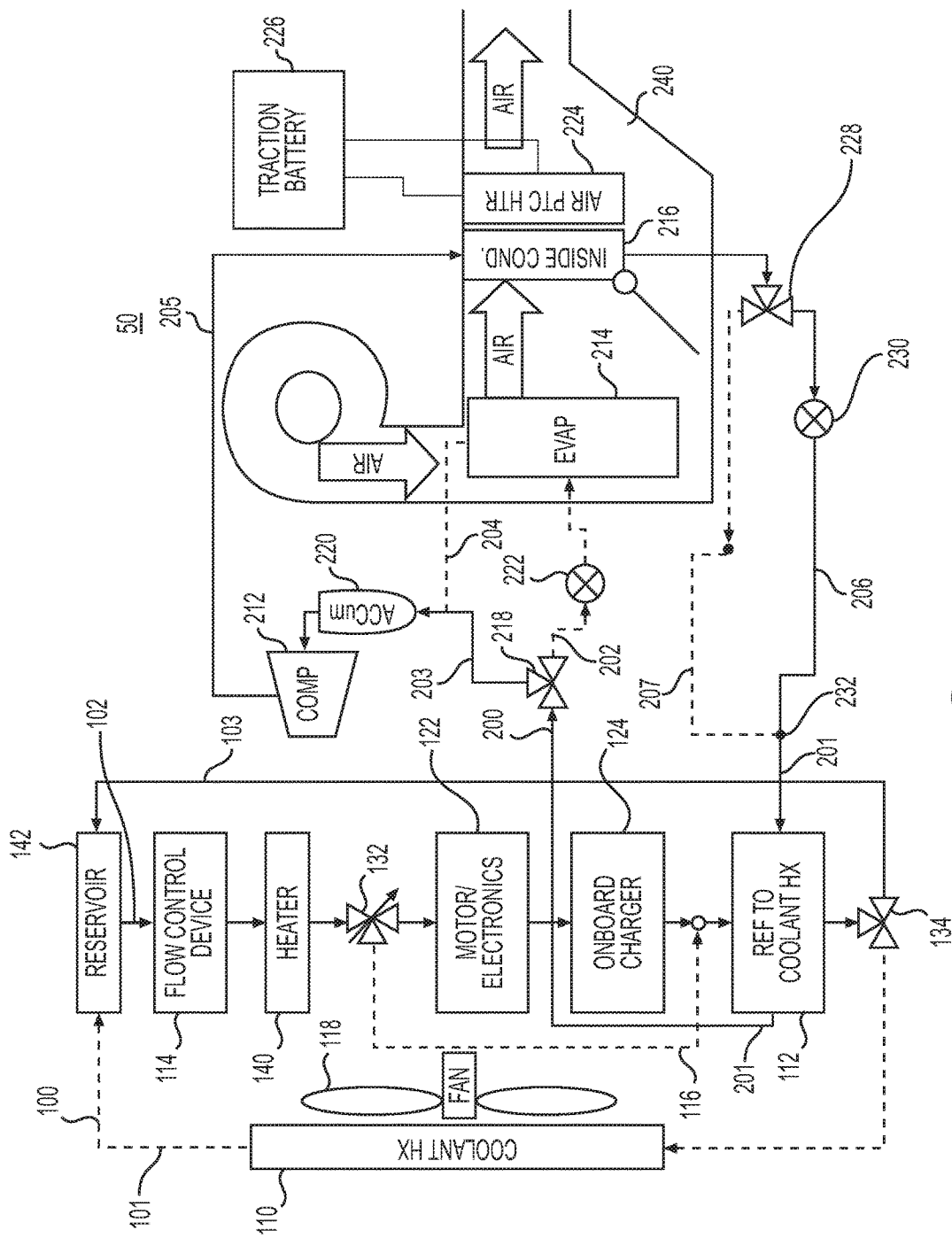
FIG. 5 is a schematic view illustrating a heat pump system in a first heating mode.
Figure 6:
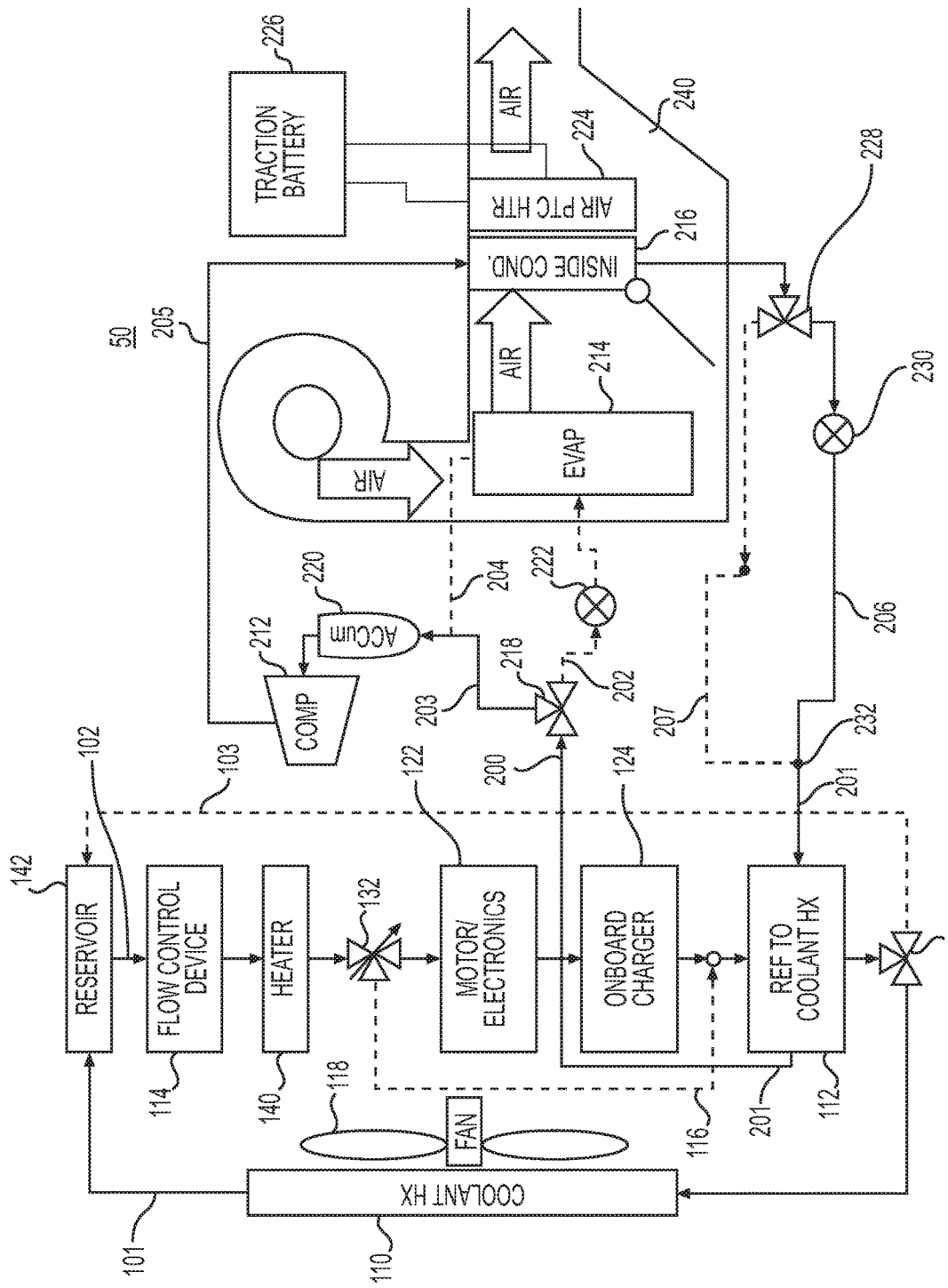
FIG. 6 is a schematic view illustrating a heat pump system in a second heating mode.

FIGS. 5-6 illustrate first and second heating modes, respectively. In both heating modes, the coolant flows through the first heating source 120, 122, 124 to gather waste heat generated from the first heating source (e.g., the electric motor/electric device 122, onboard charger 124), and then transfers the heat to the refrigerant while flowing through the refrigerant-coolant heat exchanger 112 so that energy efficiency of the heat pump system is improved.

Since the heat pump system of the present disclosure does not use the conventional type refrigerant-to-air heat exchanger and thus the heat transfer between the coolant and the refrigerant solely relies on the refrigerant-coolant heat exchanger 112, the capacity of the refrigerant-coolant heat exchanger 112 is desired to be greater than a refrigerant-coolant heat exchanger used in the conventional type heat pump system. In one form, the refrigerant-coolant heat exchanger 112 may be five times greater than the refrigerant-coolant heat exchanger used in the conventional type heat pump system. The increased capacity of the refrigerant-coolant heat exchanger 112 contributes to improving the efficiency of the heat transfer between the coolant and the refrigerant.

The first heating mode is operated when a passenger compartment is desired to be heated and the ambient air temperature ($T_a$) outside the vehicle is lower than a predetermined temperature (X). The ambient air temperature ($T_a$) can be measured by a temperature sensor installed in the vehicle, and the predetermined temperature (X) can be stored in a memory chip or a controller of the vehicle. Based on the comparison of the temperatures, the controller of the vehicle may choose either the first heating mode or the second heating mode. Meanwhile, the second heating mode can be selected if the ambient air temperature ($T_a$) outside the vehicle is equal to or higher than the predetermined temperature (X).

Referring to FIG. 5, in the first heating mode, the flow control device 114 controls the direction of the coolant to sequentially flow to the first heat source 120, the refrigerant-coolant heat exchanger 112, and the second three-way valve 134. The second three-way valve 134 inhibits the coolant from flowing into the coolant-to-air heat exchanger 110 and sends the coolant to the coolant reservoir 142. The coolant does not pass through the coolant-to-air heat exchanger 110 and thus a cold outside temperature does not have an effect on the temperature of the coolant. In other words, the coolant flows through the second and third lines 102, 103, and the first and bypass lines 101, 116 are closed. On the secondary loop side, the refrigerant flows through the first, third, fifth and sixth refrigerant lines 201, 203, 205 and 206 whereas the second, fourth and seventh refrigerant lines 202, 204 and 207 are closed.

However, if the ambient air temperature ($T_a$) outside the vehicle is high enough to heat the coolant, the heat pump system may improve its energy efficiency by utilizing the heat of the ambient air outside of the vehicle. The second heating mode is performed when the ambient air temperature ($T_a$) outside the vehicle is equal to or higher than the predetermined temperature (X). In the second heating mode, the flow control device 114 controls the direction of the coolant to sequentially flow to the first heat source 120, the refrigerant-coolant heat exchanger 112, and the second three-way valve 134. As illustrated in FIG. 6, the coolant flows through the first and second lines 101, 102 while the third line 103 is closed. In one form, the predetermined temperature (X) may be set up as being the temperature of the coolant exiting the refrigerant-to-coolant heat exchanger 112.

In particular, the second three-way valve 134 directs the coolant to flow to the coolant-to-air heat exchanger 110 from the coolant reservoir 142. While passing through the coolant-to-air heat exchanger 110, the ambient air warms up the coolant and the coolant may be subsequently heated more by the second heating source 140 (e.g., an electronic heater) and the first heating source 120. The heat in the coolant is transferred to the refrigerant via the refrigerant-to coolant heat exchanger 112 so that the heated refrigerant is used to warm up the air coming into the passenger compartment while the refrigerant sequentially passes through the refrigerant three-way valve 218, accumulator 220, compressor 212, and condenser 216 along the refrigerant circuit 200.

The air flows into the passenger compartment through the evaporator 214 and the condenser 216. In one form, the HVAC system of the vehicle may include an additional heater (e.g., PTC heater) powered by a battery 226 to provide additional heat to the air coming into the passenger compartment. In one form, the PTC heater may be a liquid PTC heater and the liquid PTC may serve as the second heat source providing heat to the coolant circuit 100 for the preconditioned heat mode in addition to its regular function in the refrigerant circuit 200.

Figure 7:
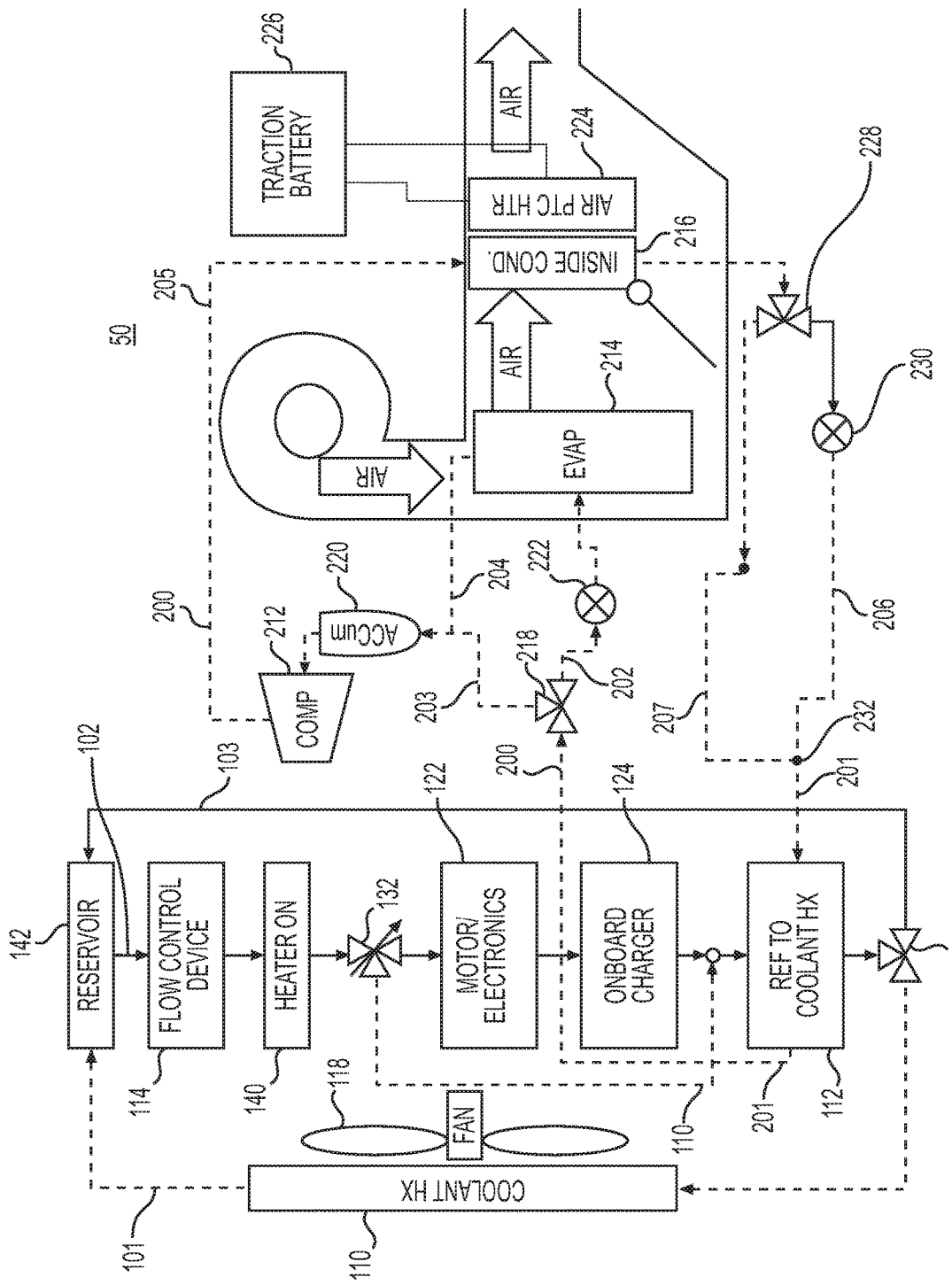
FIG. 7 is a schematic view illustrating a heat pump system in a preconditioned heat mode.

FIG. 7 describes another mode of the heat pump system, namely, a preconditioned heat mode. The second heat source 140 in the form of an electric heater or an electric liquid heater may be disposed in the coolant circuit 100, turns on, and provides heat to be transferred to and stored in the first heat source 120 (e.g., motor, electric device 122, and/or onboard charger 124) while the electric vehicle including the heat pump system 50 is connected to an outside power grid for electric charging.

More specifically, the flow control device 114 flows the coolant from the coolant reservoir 142 to the second heat source 140 through the second line 102, and thereby the coolant is heated. In other words, the heat provided by the second heat source 140 is carried by the coolant to the motor/electric device 122, and onboard charger 124, which stores the heat for future use. In this preconditioned heat mode, the second three-way valve 134 controls the coolant to directly flow from the refrigerant-coolant heat exchanger 112 to the coolant reservoir 142 through the third line 103 while the first line 101 is closed.

Once the electric vehicle is started and the HVAC system is turned on, the secondary loop 200 (i.e., refrigerant circuit) begins flowing and gathers heat energy from the coolant circuit 100. More specifically, the heat stored in the coolant and the first heat source 120 is transferred via the refrigerant-coolant heat exchanger 112 to the refrigerant circulating through the refrigerant circuit 200. Therefore, the electric vehicle may improve energy efficiency by reducing electric energy consumed by the HVAC system while the electric vehicle is driving. In another form, a liquid cooled battery may be added to the heat pump system, in particular, near the motor or electronics 122 to supply electric power and control better temperature of the battery.

Figure 8:
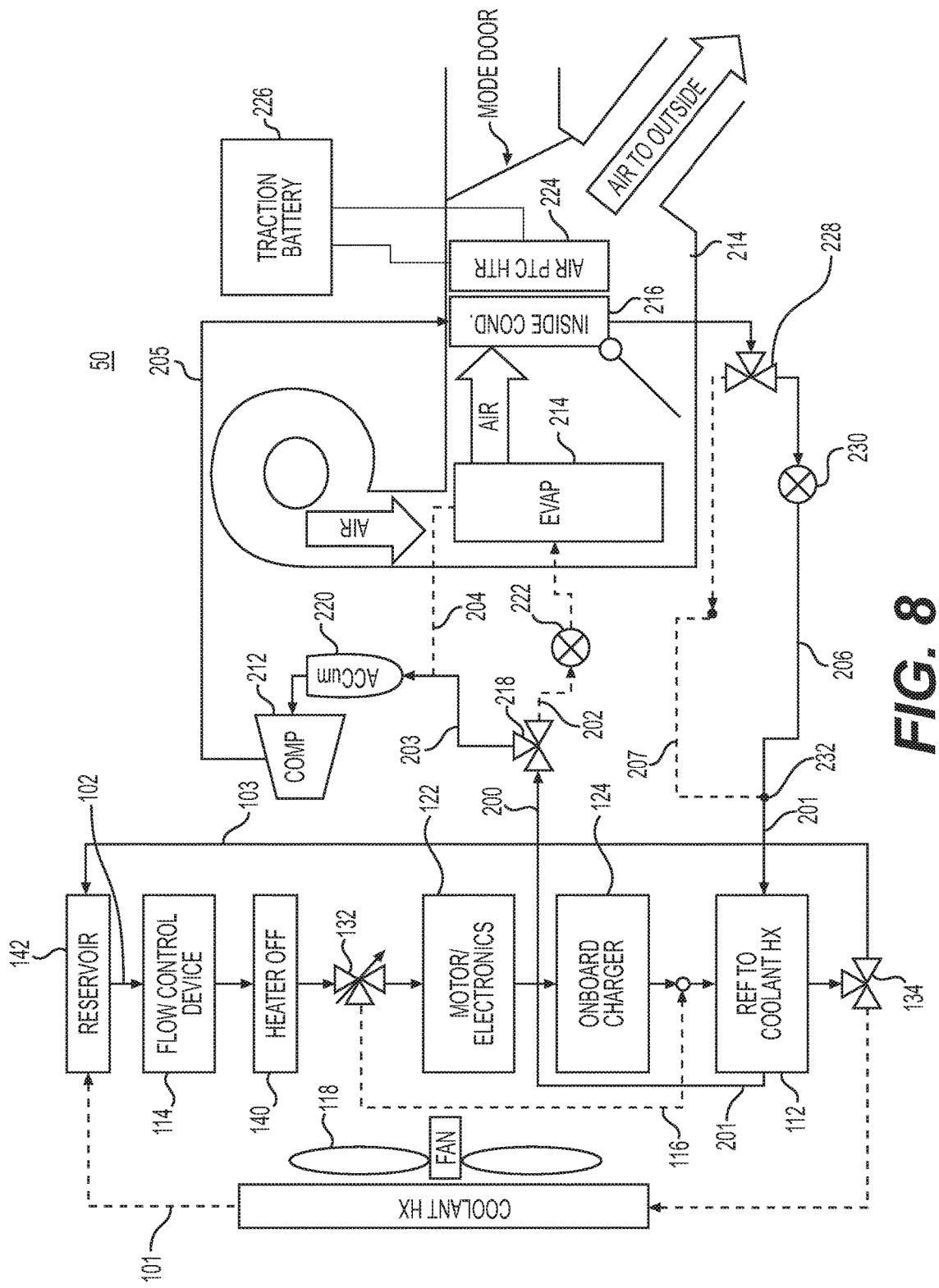
FIG. 8 is a schematic view illustrating a heat pump system in a preconditioned cooling mode.

As illustrated in FIG. 8, the heat pump system 50 provides a preconditioned cooling mode. In the preconditioned heat mode, the coolant and refrigerant both circulate in the coolant circuit 100 and the refrigerant circuit 200, respectively, while the electric vehicle including the heat pump system 50 is connected to an outside power grid for electric charging. For this mode, the second heat source 140 turns off, and the flow control device 114 controls the direction of the coolant to sequentially flow through the coolant reservoir 142, the turned-off second heat source 140, the variable coolant three-way valve 132, the first heat source 120, and the refrigerant-to-coolant heat exchanger 112 along the second line 102. The second three-way valve 134 controls the coolant to directly flow from the refrigerant-coolant heat exchanger 112 to the coolant reservoir 142 through the third line 103, and the variable coolant three-way valve 132 closes the bypassing line 116. The first line 101 is also closed.

On the refrigerant circuit side, the refrigerant flows through the first, third, fifth, and sixth refrigerant lines 201, 203, 205, 206, and the second, fourth and seventh refrigerant lines 202, 204, 207 are closed as shown in FIG. 8. The coolant is cooled by the refrigerant which is already cooled by the operation of the refrigerant circuit 200, while the coolant and refrigerant circulate in the refrigerant-coolant heat exchanger 112. During operation of this mode, the condenser 216 installed inside the electric vehicle generates heat, and the heat is released outside the vehicle through an additional vent 302 as illustrated in FIG. 8.

In the coolant circuit 100, the flow control device 114 is disposed between the coolant reservoir 142 and the variable coolant three-way valve 132 and controls the direction and amount of the coolant flow. The flow control device 114 may include various components as illustrated in FIGS. 9A-11B.

Figure 9A:
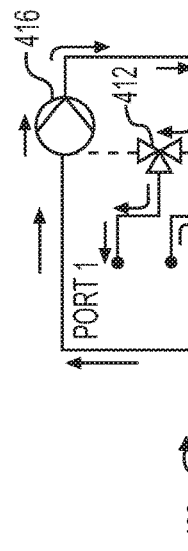
FIGS. 9A-9B are a schematic view illustrating one form of a flow control device.
Figure 9B:
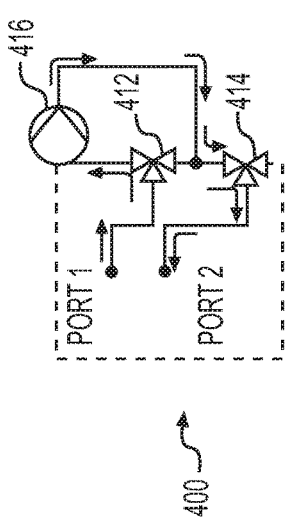

FIGS. 9A-9B illustrates one form of the flow control device 114, 400, 500, 600. The flow control device 400 includes: a first three-way valve 412, a second three-way valve 414, and a one-way coolant pump 416. When the heating modes are selected, the coolant flows from the first three-way valve 412 to the one-way coolant pump 416 and then to the second three-way valve 414. Whereas when the cooling modes are selected, the coolant flows from the second three-way valve 414 to the one-way coolant pump 416 and then to the first three-way valve 412, so that directions of the coolant flowing in the primary loop 100 are opposite each other based on the selected heating and cooling modes. The arrows in FIGS. 9A-9B illustrate the flow directions of the coolant in the selected modes, i.e., heating or cooling modes.

Figure 10A:
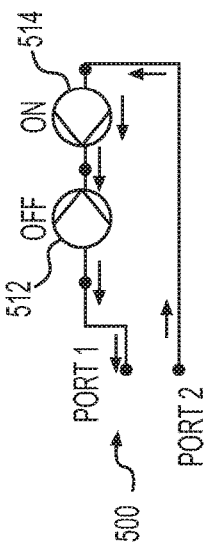
FIGS. 10A-10B are a schematic view illustrating one form of a flow control device.
Figure 10B:
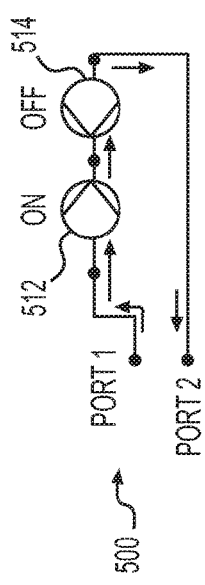

Referring to FIGS. 10A-10B, in another form of the flow control device 114, 400, 500, 600, the flow control device 500 may include: a first one-way coolant pump 512 and a second one-way coolant pump 514. With this arrangement, when either a heating mode or a cooling mode is selected, one of the first and second one-way coolant pumps 512, 514 is turned on and the other one of the first and second one-way coolant pumps is turned off. For example, for the heating mode as in FIG. 10A, the first one-way coolant pump 512 turns on whereas the second one-way coolant pump 514 turns off, and thus the coolant flows from Port 1 to Port 2, corresponding to the direction from the coolant reservoir 142 to the variable coolant three-way valve 132.

FIG. 10B describes the operation of the flow control device 500 in the cooling mode. The first one-way coolant pump 512 turns off whereas the second one-way coolant pump 514 turns on, and thus the coolant flows from Port 2 to Port 1, corresponding to the direction from the variable coolant three-way valve 132 to the coolant reservoir 142. Thus, the direction of the coolant under the cooling mode is opposite of the direction of the coolant under the heating mode.

Figure 11A:
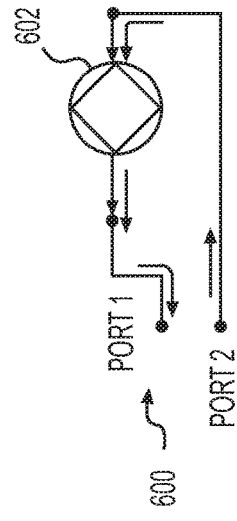
FIGS. 11A-11B are a schematic view illustrating one form of a flow control device.
Figure 11B:
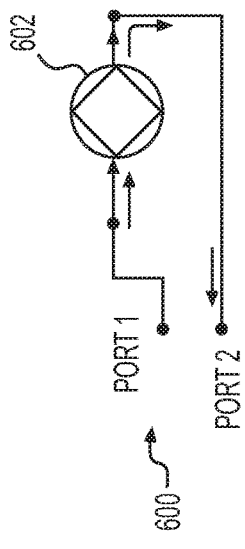

In another form of the flow control device 114, 400, 500, 600, the flow control device 600 may have a reversible coolant pump 602. As illustrated in FIGS. 11A and 11B, this flow control device 600 is simple and compact and thus a light and low cost form of the flow control device. The reversible coolant pump 602 can discharge the coolant in one direction as well as in an opposite direction (i.e., a reverse direction). In the heating mode as shown in FIG. 11A, the reversible coolant pump 602 discharges the coolant from Port 1 to Port 2, which corresponds to the direction from the coolant reservoir 142 to the variable coolant three-way valve 132. In the cooling mode, as illustrated in FIG. 11B, the reversible coolant pump 602 discharges the coolant from Port 2 to Port 1, which corresponds to the direction from the variable coolant three-way valve 132 to the coolant reservoir 142.

As illustrated in the Figures, the heat pump system 50 of the present disclosure does not contain a bypass around the second heat exchanger, i.e., the refrigerant-coolant heat exchanger 112 such that the refrigerant always passes through the refrigerant-coolant heat exchanger 112 where the coolant and the refrigerant exchange heat each other. For the improved heat transfer via the refrigerant-coolant heat exchanger 112, the capacity of the refrigerant-coolant heat exchanger 112 is greater than the capacity of a refrigerant-coolant heat exchanger used in a conventional type heat pump system.

The heat pump system of the present disclosure improves the efficiencies of both the electric vehicle powertrain cooling system and the HVAC system by taking advantage of synergies between the systems with the larger refrigerant-coolant heat exchanger. In addition, the removal of an outside refrigerant-to-air heat exchanger and other components relating to the function of the refrigerant-to-air heat exchanger and the use of the flow control device 142 contribute to the reduction of cost, amount of the refrigerant, and weight in the HVAC system.

Figure 12:
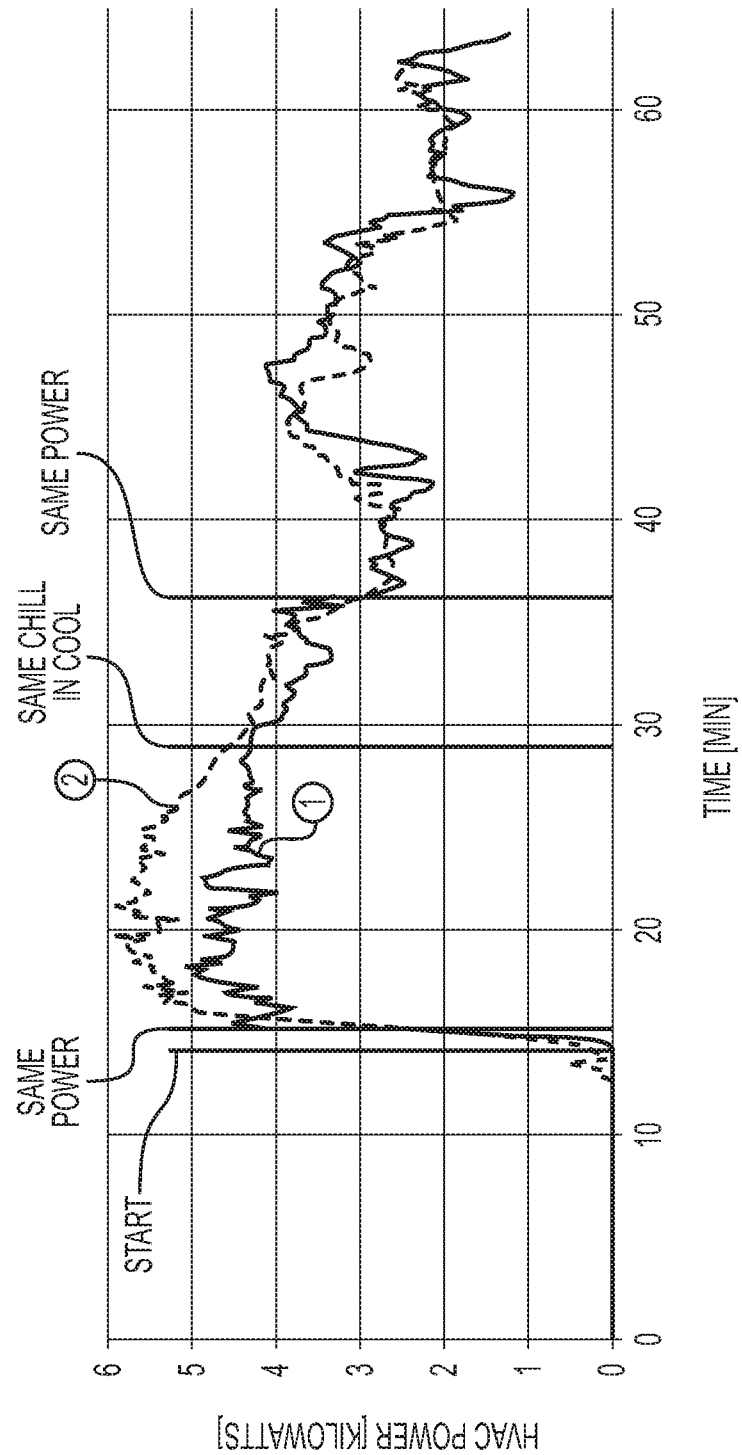
FIG. 12 is a diagram illustrating energy consumption by a HVAC system in a preconditioned heat mode.

Furthermore, the preconditioned heat mode using the second heat source 140 decreases energy consumption by the HVAC system (e.g., approximately 17% less energy consumption) and thereby increases the running range of the electric vehicle by approximately 13% at −18° C., 4% at −5° C. FIG. 12 is a test result showing the energy consumption by the HVAC system of the present disclosure (i.e., line ①) and by the conventional HVAC system (i.e., line ②). As shown in FIG. 12, the energy consumption by the HVAC system of the present disclosure is approximately 17% lower than the energy consumption by the conventional HVAC system.

Figure 13:
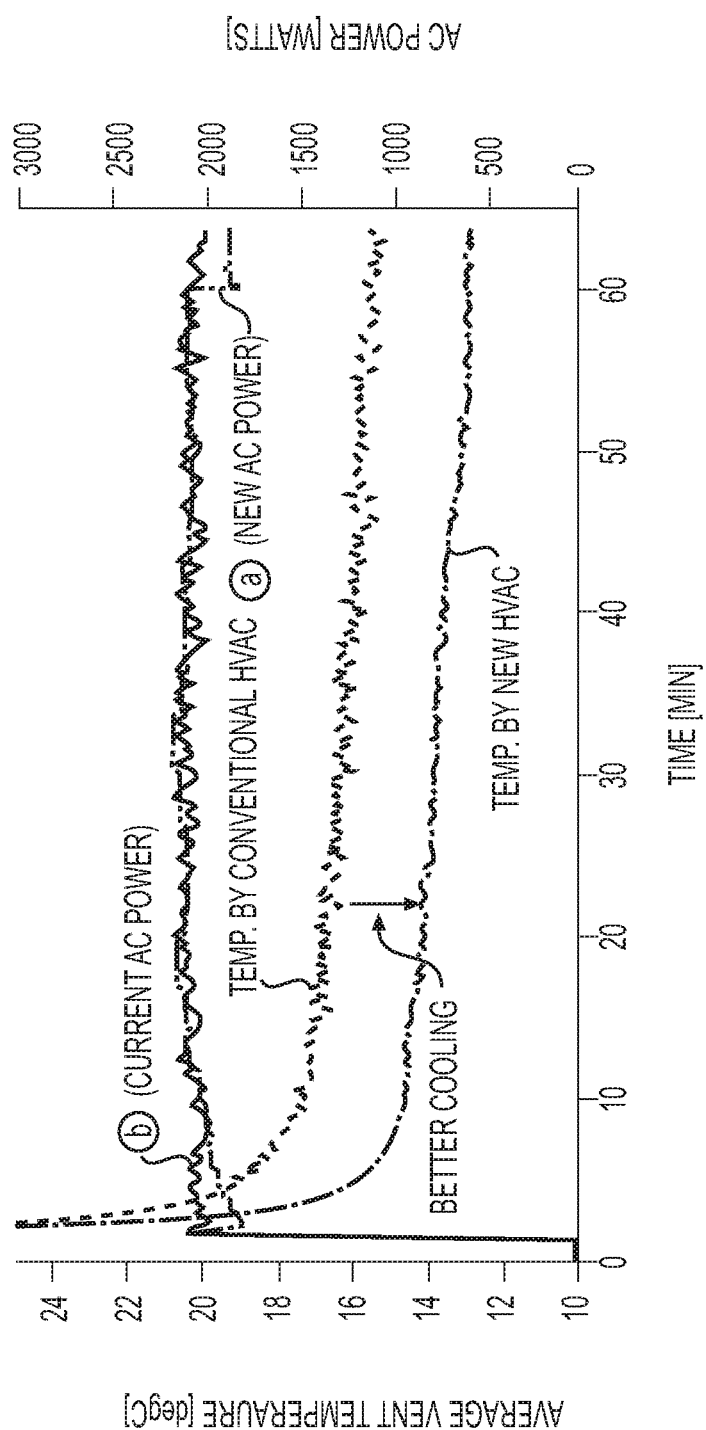
FIG. 13 is a diagram illustrating energy consumption by a HVAC system in a cooling mode.

FIG. 13 is a test result conducted in a cooling mode by the HVAC system of the present disclosure (i.e., line ⓑ) and by the conventional type HVAC system (i.e., line ⓐ). In particular, when the HVAC system operates with the heat pump system of the present disclosure under the cooling mode, the cooling efficiency is improved and the AC power consumption is reduced, compared to the conventional type heat pump system.

What is claimed is:

1. A heat pump system for a vehicle having a first heat source, the heat pump system comprising:
   a first heat exchanger;
   a second heat exchanger;

a primary loop through which coolant circulates, the primary loop passing through the first and second heat exchangers, the primary loop including a flow control device configured to control a direction of a coolant passing through the primary loop, the primary loop further including a bypassing line through which the coolant selectively bypasses a first heat source in the primary loop; and a secondary loop through which a refrigerant circulates, the secondary loop thermally coupled to the primary loop via the second heat exchanger, the secondary loop further including a compressor, an evaporator, and a condenser.

2. The heat pump system of claim 1, wherein the first heat exchanger is a coolant-to-air heat exchanger, and the second heat exchanger is a refrigerant-coolant heat exchanger.

3. The heat pump system of claim 1, wherein the first heat source in the primary loop is at least one of a motor, an electric device, or an onboard charger of an electric vehicle.

4. The heat pump system of claim 1, wherein the primary loop further includes a second heat source arranged between the flow control device and the first heat source.

5. The heat pump system of claim 1, wherein the primary loop further includes a first control valve placed between the first heat source and the flow control device and configured to control an amount of the coolant bypassing the first heat source in the primary loop through the bypassing line based on a selected mode.

6. The heat pump system of claim 5, wherein the primary loop further includes a second control valve placed between the first heat exchanger and the second heat exchanger, the second control valve configured to control the coolant flowing into the first and second heat exchangers based on a selected mode.

7. The heat pump system of claim 1, wherein the flow control device includes a first three-way valve, a second three-way valve, and a one-way coolant pump, and wherein when a heating mode is selected, the coolant flows from the first three-way valve to the one-way coolant pump and then to the second three-way valve, and when a cooling mode is selected, the coolant flows from the second three-way valve to the one-way coolant pump and then to the first three-way valve, so that directions of the coolant in the primary loop are opposite each other based on the selected heating and cooling modes.

8. The heat pump system of claim 1, wherein the flow control device includes a first one-way coolant pump and a second one-way coolant pump, and when either a heating mode or a cooling mode is selected, one of the first and second one-way coolant pumps is turned on and the other one of the first and second one-way coolant pumps is turned off so that a direction of the coolant under the cooling mode is opposite to a direction of the coolant under the heating mode.

9. The heat pump system of claim 1, wherein the flow control device includes a reversible coolant pump configured to discharge the coolant in one direction in a heating mode, and wherein the reversible coolant pump, under a cooling mode, is configured to discharge the coolant in an opposite direction to the direction of the coolant in the heating mode.

10. The heat pump system of claim 1, wherein the second loop does not contain a bypass around the second heat exchanger such that the refrigerant always passes through the second heat exchanger.

11. The heat pump system of claim 1, wherein the secondary loop passes through the first heat source.

12. A heat pump system for an electric vehicle, comprising:

a coolant-to-air heat exchanger;
a refrigerant-coolant heat exchanger;
a coolant circuit passing through the coolant-to-air heat exchanger and the refrigerant-coolant heat exchanger and further comprising: a flow control device configured to control a direction of a coolant passing through the coolant circuit based on a mode selected among a plurality of modes, and a bypassing line through which the coolant selectively bypasses a first heat source; and
a refrigerant circuit through which a refrigerant circulates, wherein the refrigerant-coolant heat exchanger is configured to thermally couple the refrigerant circuit with the coolant circuit.

13. The heat pump system of claim 12, wherein the first heat source in the coolant circuit is at least one of a motor, an electric device, or an onboard charger of the electric vehicle.

14. The heat pump system of claim 13, wherein the coolant circuit further comprises a coolant reservoir, a first three-way valve configured to control an amount of the coolant bypassing the first heat source, and a second three-way valve, and wherein the second three-way valve is connected to the coolant reservoir, the coolant-to-air heat exchanger, and the refrigerant-coolant heat exchanger, and is configured to control the coolant flowing into the coolant-to-air heat exchanger and the refrigerant-coolant heat exchanger from the coolant reservoir based on the selected mode.

15. The heat pump system of claim 14, wherein when the selected mode is a first cooling mode and heat from the first heat source is lower than a predetermined temperature, and the coolant flows from the first heat source to the coolant-to-air exchanger by the flow control device and substantial majority of the coolant bypasses the first heat source through the bypassing line by the first three-way valve.

16. The heat pump system of claim 14, wherein when the selected mode is a second cooling mode and heat from the first heat source is equal to or more than a predetermined temperature, and the coolant flows from the first heat source to the coolant-to-air exchanger by the flow control device and the bypassing line is closed by the first three-way valve so that the coolant flows only through the first heat source.

17. The heat pump system of claim 14, wherein when the selected mode is a first heating mode, the flow control device controls the direction of the coolant to sequentially flow to the first heat source, the refrigerant-coolant heat exchanger, and the second three-way valve, and wherein the second three-way valve inhibits the coolant from flowing into the coolant-to-air heat exchanger and sends the coolant to the coolant reservoir.

18. The heat pump system of claim 14, wherein when the selected mode is a second heating mode and an ambient air temperature is higher than a predetermined temperature, the flow control device controls the direction of the coolant to sequentially flow to the first heat source, the refrigerant-coolant heat exchanger, and the second three-way valve, and wherein the second three-way valve inhibits the coolant from flowing into the coolant reservoir and sends the coolant to the coolant-to-air heat exchanger.

19. The heat pump system of claim 14, wherein the heat pump system further comprises an electric heater disposed in the coolant circuit and configured to transfer heat to the first heat source while the electric vehicle is connected to an outside power grid for electric charging.

* * * * *